United States Patent
Fujishiro

(10) Patent No.: US 8,150,469 B2
(45) Date of Patent: Apr. 3, 2012

(54) ADAPTIVE ARRAY BASE STATION DEVICE AND ADAPTIVE ARRAY BASE STATION DEVICE CONTROL METHOD

(75) Inventor: Masato Fujishiro, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 891 days.

(21) Appl. No.: 12/280,670

(22) PCT Filed: Feb. 26, 2007

(86) PCT No.: PCT/JP2007/053497
§ 371 (c)(1),
(2), (4) Date: Aug. 25, 2008

(87) PCT Pub. No.: WO2007/099900
PCT Pub. Date: Sep. 7, 2007

(65) Prior Publication Data
US 2009/0015475 A1    Jan. 15, 2009

(30) Foreign Application Priority Data

Feb. 27, 2006 (JP) .................................. 2006-051289
Feb. 27, 2006 (JP) .................................. 2006-051290

(51) Int. Cl.
H04M 1/00 (2006.01)
(52) U.S. Cl. .............. 455/562.1; 455/115.1; 455/69; 455/424; 455/561; 455/522; 342/368
(58) Field of Classification Search ........... 455/562.1, 455/115.1, 69, 424, 561, 522; 342/368
See application file for complete search history.

(56) References Cited

U.S. PATENT DOCUMENTS

| 6,624,784 | B1 * | 9/2003 | Yamaguchi | 342/378 |
| 6,748,216 | B1 * | 6/2004 | Lee | 455/434 |
| 7,643,794 | B2 * | 1/2010 | Ofek et al. | 455/25 |
| 7,675,988 | B2 * | 3/2010 | Kim et al. | 375/267 |
| 2004/0203347 | A1 * | 10/2004 | Nguyen | 455/13.3 |
| 2004/0240410 | A1 | 12/2004 | Hayashi et al. | |

FOREIGN PATENT DOCUMENTS

| JP | 63-269626 | 11/1988 |
| JP | 2003284126 A | 10/2003 |
| JP | 2004-289407 | 10/2004 |
| JP | 2004-312381 | 11/2004 |

* cited by examiner

Primary Examiner — Sanh Phu
(74) Attorney, Agent, or Firm — DLA Piper LLP (US)

(57) ABSTRACT

An array antenna forming unit (22) combines at least two transmission/reception devices (40) to thereby sequentially form one array antenna. Every time an array antenna is formed, an array antenna transmission/reception control unit (25) sends a radio signal having a predetermined directivity pattern from the array antenna to each of some or all of other antenna elements (42) not forming the array antenna. An array antenna communication performance measurement unit (26) measures a reception level in each of some or all of the antenna elements (42) with respect to a transmission from each array antenna, and calculates respective array antenna communication performance values, based on the measured reception levels. An array antenna determining unit (23) determines a combination of at least two transmission/reception devices (40) forming an array antenna having a predetermined performance condition, based on the array antenna communication performance values.

14 Claims, 10 Drawing Sheets

(a)
FIG. 1
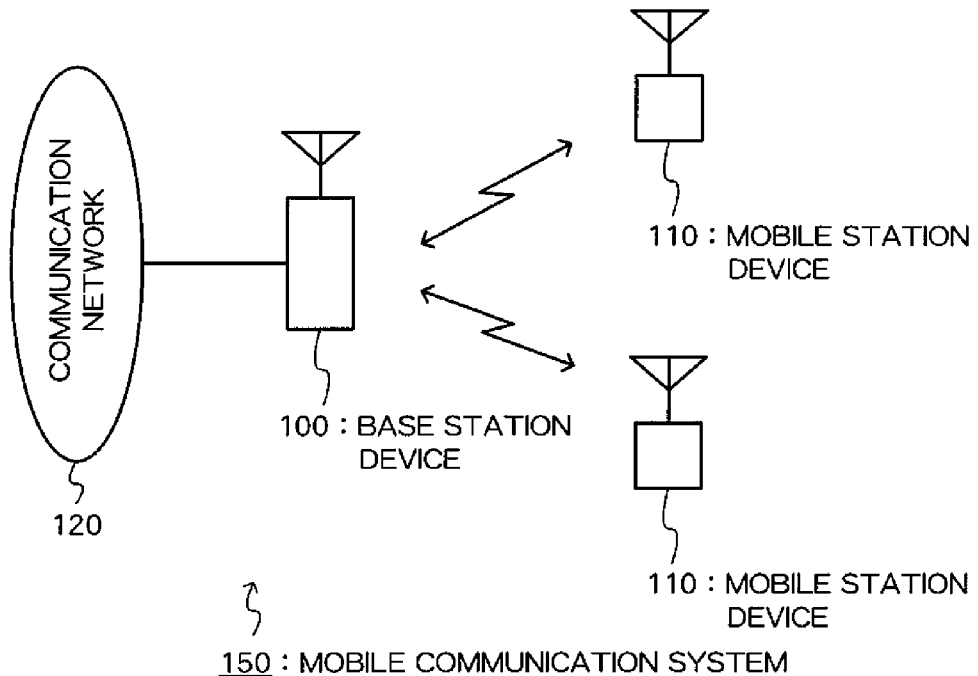
150 : MOBILE COMMUNICATION SYSTEM
(b)
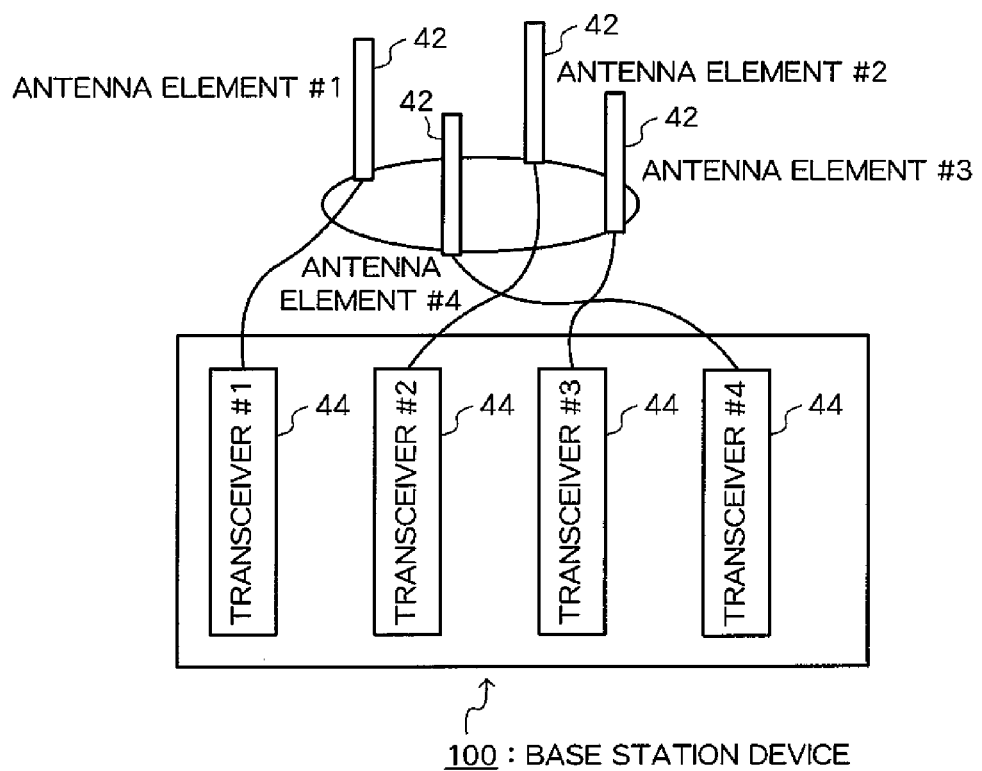
100 : BASE STATION DEVICE FIG.3
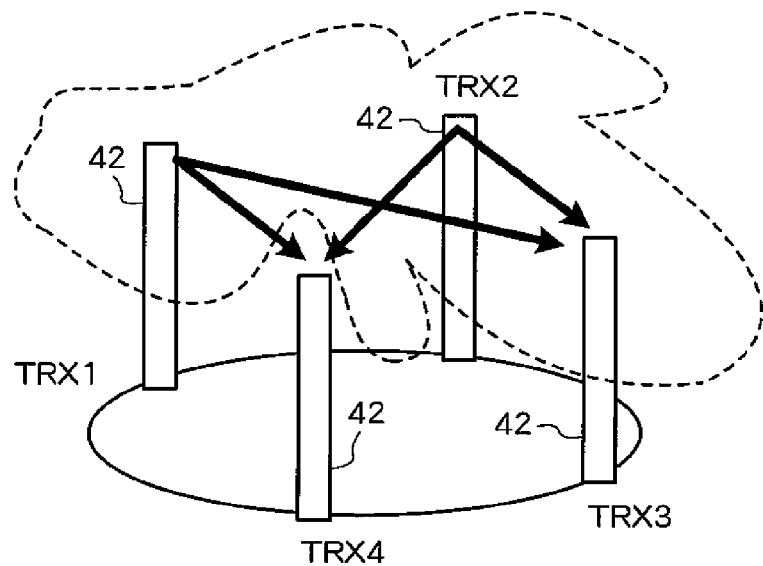
FIG.4
| RECEPTION LEVEL MEASUREMENT RESULT [dBm] | | | | |
|---|---|---|---|---|
| TRANSMISSION \ RECEPTION | TRX1 | TRX2 | TRX3 | TRX4 |
| TRX1&2 | — | — | −15.0 | −49.2 |
| TRX1&3 | — | −15.5 | — | −37.5 |
| TRX1&4 | — | −16.5 | −48.8 | — |
| TRX2&3 | −17.3 | — | — | −44.0 |
| TRX2&4 | −17.2 | — | −34.5 | — |
| TRX3&4 | −16.6 | −50.8 | — | — |
FIG.5
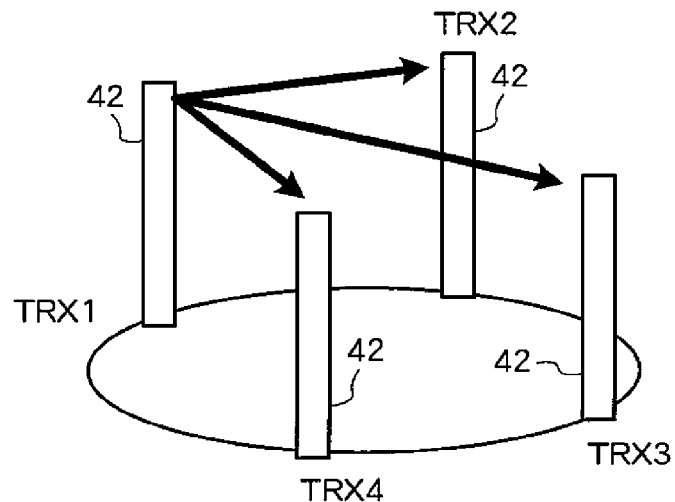

| RECEPTION LEVEL MEASUREMENT RESULT [dBm] | | | | |
|---|---|---|---|---|
| TRANSMISSION \ RECEPTION | TRX1 | TRX2 | TRX3 | TRX4 |
| TRX1 | — | −20.0 | −25.0 | −21.0 |
| TRX2 | −20.0 | — | −19.0 | −24.0 |
| TRX3 | −25.0 | −19.0 | — | −20.0 |
| TRX4 | −21.0 | −24.0 | −20.0 | — |

(b)

| REFERENCE RECEPTION LEVEL CALCULATION RESULT [dBm] | | | | |
|---|---|---|---|---|
| TRANSMISSION \ RECEPTION | TRX1 | TRX2 | TRX3 | TRX4 |
| TRX1&2 | — | — | −18.0 | −19.2 |
| TRX1&3 | — | −16.5 | — | −17.5 |
| TRX1&4 | — | −18.5 | −18.8 | — |
| TRX2&3 | −18.8 | — | — | −18.5 |
| TRX2&4 | −17.5 | — | −16.5 | — |
| TRX3&4 | −19.5 | −17.8 | — | — |

FIG.8

| ISOLATION CALCULATION RESULT | | | | [dB] |
|---|---|---|---|---|
| TRANSMISSION \ RECEPTION | TRX1 | TRX2 | TRX3 | TRX4 |
| TRX1 | — | −50.0 | −55.0 | −51.0 |
| TRX2 | −50.0 | — | −49.0 | −54.0 |
| TRX3 | −55.0 | −49.0 | — | −50.0 |
| TRX4 | −51.0 | −54.0 | −50.0 | — |

FIG.9

| ARRAY ANTENNA COMMUNICATION PERFORMANCE VALUE CALCULATION RESULT | | | | [dB] |
|---|---|---|---|---|
| TRANSMISSION \ RECEPTION | TRX1 | TRX2 | TRX3 | TRX4 |
| TRX1&2 | — | — | +2.7 | −30.0 |
| TRX1&3 | — | +1.0 | — | −50.0 |
| TRX1&4 | — | +3.0 | −20.0 | — |
| TRX2&3 | +2.9 | — | — | −25.5 |
| TRX2&4 | +0.3 | — | −48.0 | — |
| TRX3&4 | +2.5 | −33.0 | — | — |

| EVALUATION RESULT | |
|---|---|
| STANDARD | TRX1&2, TRX3&4 |
| MAKING MUCH OF BEAM FORMING PERFORMANCE | TRX1&4, TRX2&3 |
| MAKING MUCH OF NULL STEERING PERFORMANCE | TRX1&3, TRX2&4 |

US 8,150,469 B2

ADAPTIVE ARRAY BASE STATION DEVICE AND ADAPTIVE ARRAY BASE STATION DEVICE CONTROL METHOD

CROSS-REFERENCE TO THE RELATED APPLICATIONS

This application is a national stage of international application No. PCT/JP2007/053497 filed Feb. 26, 2007, which also claims the benefit of priority under 35 USC 119 to Japanese Patent Application No. 2006-051289 filed Feb. 27, 2006 and Japanese Patent Application No. 2006-051290 filed Feb. 27, 2006, the entire contents of which are incorporated herein by reference.

TECHNICAL FIELD

The present invention relates to an adaptive array base station device and a control method therefor, and in particular, to an adaptive array base station device having three or more transmission/reception devices, each including at least one antenna element and transmission/reception control means for controlling transmission/reception of a radio signal via the antenna element, and a control method therefor, and an adaptive array base station device for carrying out radio communication with each of a plurality of mobile station devices, selectively using at least three antenna elements, and a control method therefor.

BACKGROUND ART

An adaptive array antenna is an antenna having a plurality of antenna elements for adaptively controlling the directivity according to a radio-wave propagation environment to acquire a desired wave and suppress an interference wave. An adaptive array antenna is characteristic in that a main beam is directed to a desired direction by means of beam forming, and that a null point of a directivity pattern is formed in an interfering direction by means of null steering.

In general, it is known that an adaptive array antenna presents more favorable transmission/reception characteristic when correlation between transmission/reception signals in the respective antenna elements forming an array is smaller. As the correlation theoretically becomes smaller as the special distance between the antenna elements becomes larger, it is generally a case in which two or more antenna elements located sufficiently apart from each other are combined to thereby form a single adaptive array antenna.

However, in actuality, the correlation is changed due to various factors other than the spatial distance between the antenna elements. For example, a displaced antenna position due to inappropriate installation or the like, manufacturing variation or aged deterioration of an antenna element and a transmission/reception device including the antenna element, and so forth can be major causes to change the correlation between the antenna elements or transmission/reception devices. Further, leakage of an radio wave through a shielding gap in a transmission/reception device which is caused when a high frequency shielding in the transmission/reception device is manufactured with insufficient accuracy may also cause to change the correlation. Still further, change in the surrounding radio wave environment may also cause to change the correlation. When adaptive array transmission/reception is carried out using a combination of antenna elements or transmission/reception devices having correlation thereof deteriorated due to the above described causes, the adaptive array performance thereof, that is, beam directivity performance thereof, is remarkably deteriorated.

In view of the above, there is currently proposed a technique for determining an antenna element combination having the smallest correlation by calculating the correlation between antenna elements, based on actual measurement values of signals received at the respective antenna elements, rather than being premised on the theoretical correlation based on the spatial distance between the antenna elements.

For example, Patent Document 1, described below, discloses a technique, employed in an radio wave transmission/reception device equipped with a plurality of antenna elements having mutually different polarization directions and located spatially apart from one another, for determining an antenna element combination having the smallest correlation coefficient, based on signals received at the respective antenna elements, to thereby ensure sufficient transmission capacity, while reducing the antenna element correlation, even in a sequentially changing environment.

Also, Patent Document 2, described below, discloses a technique, employed in an adaptive array radio device having three or more antenna elements, for estimating respective antenna correlation values, based on the respective signals subjected to adaptive array reception by two selected antenna elements, and determining a combination of two antenna elements having the smallest antenna correlation value, to thereby improve the adaptive array receiving performance, while minimizing an addition of an antenna element and a transmission/reception device.

Patent Document 1: Japanese Patent Laid-open Publication No. 2004-312381
Patent Document 2: Japanese Patent Laid-open Publication No. 2004-289407

DISCLOSURE OF THE INVENTION

Problems to be Solved by the Invention

According to the techniques disclosed in Patent Documents 1 and 2, a radio signal sent from another transmission device is received, and the correlation between antenna elements is calculated based on the received signal. According to the technique, a combination of the antenna elements having the minimum receiving correlation can be determined, and receiving performance can be improved.

However, the above described technique has a problem that the technique is premised on the presence of another device for sending a radio signal.

Further, as a difference in communication performance among a plurality of combinations of antenna elements is not taken into consideration, there is a problem that a combination of antenna elements having appropriate communication performance for a communication state cannot be selected. For example, suppose that a base station device is communicating with a mobile station device. Then, when the mobile station device moves to a weak electric field area, use of a combination of antenna elements superior in beam forming performance is desired in order to avoid communication disconnection. Meanwhile, when another mobile station device communicating with another base station device moves into the coverage area of the base station device, use of a combination of antenna elements superior in null steering performance is desired in order to prevent deterioration of the communication quality of its own station by suppressing the interference by the communication by the other mobile station device. As described above, when selection of a combination of antenna elements having appropriate communication performance for a communication state is not possible, the communication performance may be remarkably deteriorated.

The present invention has been conceived in view of the above conventional problem, and a first object of the present invention is to provide an adaptive array base station device for determining in a self-supporting manner, without being premised on the presence of another device, an optimum combination of antenna elements and transmission/reception devices including the antenna elements and improving the adaptive array performance, and a control method therefor.

A second object is to provide an adaptive array base station device for switching combinations of antenna elements or transmission/reception devices including the antenna elements for use in each communication, depending on the state of communication with each mobile station device to thereby improve the adaptive array performance of the entire base station device, and a control method therefor.

Means for Solving the Problems

In order to achieve the first object described above, an adaptive array base station device according to the present invention is an adaptive array base station device having three or more transmission/reception devices each including at least one antenna element and transmission/reception control means for controlling transmission/reception of a radio signal via the antenna element, including array antenna forming means for selecting at least two of the transmission/reception devices and combining the selected transmission/reception devices, to thereby sequentially form one array antenna; array antenna transmission control means, every time the array antenna forming means forms the array antenna, for transmitting a radio signal having a predetermined directivity pattern from the array antenna to each receiving antenna element which is the antenna element included in each of some or all of the transmission/reception device(s) other than the at least two transmission/reception devices forming the array antenna; array antenna communication performance measurement means for measuring a reception level of the radio signal received at each of some or all of the receiving antenna elements with respect to a transmission from each of the array antennas sequentially formed by the array antenna forming means, and calculating respective array antenna communication performance values, each indicating communication performance of each of the array antennas, based on the respective reception levels; and array antenna determination means for selecting an array antenna having the array antenna communication performance value satisfying a predetermined performance condition, based on some or all of the respective array antenna communication performance values generated by the array antenna communication performance measurement means, and determining a combination of the at least two transmission/reception devices forming the array antenna.

A control method for an adaptive array base station device according to the present invention is a control method for an adaptive array base station device having three or more transmission/reception devices each including at least one antenna element and transmission/reception control means for controlling transmission/reception of a radio signal via the antenna element, including an array antenna forming step of selecting at least two of the transmission/reception devices and combining the selected transmission/reception devices, to thereby sequentially form one array antenna; an array antenna transmission control step, every time the array antenna is formed at the array antenna forming step, for transmitting a radio signal having a predetermined directivity pattern from the array antenna to each receiving antenna element which is the antenna element included in each of some or all of the transmission/reception device(s) other than the at least two transmission/reception devices forming the array antenna; an array antenna communication performance measurement step of measuring a reception level of the radio signal received at each of some or all of the receiving antenna elements with respect to a transmission from each of the array antennas sequentially formed at the array antenna forming step, and calculating respective array antenna communication performance values, each indicating communication performance of each of the array antennas, based on the respective reception levels; and an array antenna determination step of selecting an array antenna having the array antenna communication performance value satisfying a predetermined performance condition, based on some or all of the respective array antenna communication performance values generated at the array antenna communication performance measurement step, and determining a combination of the at least two transmission/reception devices forming the array antenna.

According to the present invention, at least two transmission/reception devices are combined to thereby sequentially form one array antenna. Every time an array antenna is formed, a radio signal having a predetermined directivity pattern is sent from the array antenna to an antenna element (a receiving antenna element) included in each of some or all of the transmission/reception device(s) other than the at least two transmission/reception devices forming the array antenna. Then, with respect to a transmission from each array antenna, a reception level of a radio signal received at each of some or all of the receiving antenna elements is measured. In addition, array antenna communication performance values, each indicating communication performance of each array antenna, are calculated based on the respective reception levels. Then, an array antenna having an array antenna communication performance value satisfying a predetermined performance condition is selected based on some or all of the respective array antenna communication performance values, and a combination of at least two transmission/reception devices forming the array antenna is determined. According to the present invention, it is possible to determine in a self-supporting manner, without being premised on the presence of another device, an optimum combination of the antenna elements and transmission/reception devices including the antenna elements and to improve the adaptive array performance.

In one aspect of the present invention, the array antenna communication performance measurement means may further include individual transmission control means for sequentially transmitting, from each of the at least two transmission/reception devices forming the array antenna, a radio signal having a transmission power equivalent to each transmission power in a transmission of the radio signal from the array antenna, carried out by the array antenna transmission control means, and reference reception level measurement means for measuring a reception level of the radio signal received at each of the some or all of the receiving antenna elements with respect to the transmission from each of the at least two transmission/reception devices, and calculating a reference reception level which is a sum of at least two of the reception levels, and calculate the respective array antenna communication performance values, further based on the reference reception level. With the above, it is possible to determine a combination of transmission/reception devices forming an array antenna, based on a gain of a reception level obtained by carrying out an array antenna transmission.

Also, in one aspect of the present invention, the predetermined directivity pattern may have directivity in a direction of at least any one of the receiving antenna elements among the respective receiving antenna elements, and the predetermined performance condition may state that the array antenna communication performance value in at least the any one receiving antenna element is equal to or larger than a predetermined value. With the above, it is possible to determine a combination of transmission/reception devices forming an array antenna, based on the beam forming performance of the array antenna.

Also, in one aspect of the present invention, the predetermined directivity pattern may further have a null point of the directivity in a direction of each of at least some other receiving antenna elements other than the any one receiving antenna element, and the predetermined performance condition may further include a condition stating that the array antenna communication performance value in each of the at least some other receiving antenna elements is smaller than the predetermined value. With the above, it is possible to determine a combination of transmission/reception devices forming an array antenna, based on the beam forming performance and null steering performance of the array antenna.

Meanwhile, in order to achieve the second object described above, an adaptive array base station device according to the present invention is an adaptive array base station device for carrying out radio communication with each of a plurality of mobile station devices, selectively using at least three antenna elements, including array antenna forming means for selecting at least two of the antenna elements and combining the selected antenna elements, to thereby sequentially form one array antenna; array antenna communication performance measurement means, every time the array antenna forming means forms the array antenna, for measuring communication performance of the array antenna, and calculating respective array antenna communication performance values, each indicating communication performance of each of the array antennas, based on the respective measurement results; and array antenna switching means for selecting an array antenna having the array antenna communication performance value satisfying a predetermined performance condition, based on some or all of the respective array antenna communication performance values generated by the array antenna communication performance measurement means, and using the array antenna in communication with at least one of the mobile station devices.

Also, a control method for an adaptive array base station device according to the present invention is a control method for an adaptive array base station device for carrying out radio communication with each of a plurality of mobile station devices, selectively using at least three antenna elements, including an array antenna forming step of selecting at least two of the antenna elements and combining the selected antenna elements, to thereby sequentially form one array antenna; an array antenna communication performance measurement step, every time the array antenna is formed at the array antenna forming step, of measuring communication performance of the array antenna, and calculating respective array antenna communication performance values, each indicating communication performance of each of the array antennas, based on the respective measurement results; and an array antenna switching step of selecting an array antenna having the array antenna communication performance value satisfying a predetermined performance condition, based on some or all of the respective array antenna communication performance values generated at the array antenna communication performance measurement step, and using the array antenna in communication with at least one of the mobile station devices.

According to the present invention, at least two antenna elements are combined to thereby sequentially form one array antenna. Every time an array antenna is formed, communication performance of the array antenna is measured, and array antenna communication performance values, each indicating communication performance of each array antenna, are calculated based on the respective measurement results. Then, an array antenna having an array antenna communication performance value satisfying a predetermined performance condition is selected based on some or all of the respective array antenna communication performance values, and used in communication with at least one mobile station device. According to the present invention, it is possible to switch combinations of antenna elements used in communication with each mobile station device, based on the array antenna communication performance values, and to improve the adaptive array performance of the entire base station device.

In one aspect of the present invention, the predetermined performance condition may be determined based on information describing a communication state in the communication with each of the mobile station devices. With the above, it is possible to switch combinations of antenna elements used in each communication, depending on the state of communication with each of the mobile station devices, and to improve the adaptive array performance of the entire base station device.

In one aspect of the present invention, the communication state in the communication with each of the mobile station devices may be communication quality in each communication. With the above, it is possible to switch combinations of antenna elements used in each communication, depending on the communication quality of communication with each of the mobile station devices, and to improve the adaptive array performance of the entire base station device.

In one aspect of the present invention, the communication state in the communication with each of the mobile station devices may be the number of the mobile station devices engaged in communication with the adaptive array base station device. With the above, it is possible to switch combinations of the antenna elements to use in each communication, depending on the number of mobile station devices engaged in communication with the base station device, and to improve the adaptive array performance of the entire base station device.

In one aspect of the present invention, the adaptive array base station device may include three or more transmission/reception devices, each including the at least one antenna element and transmission/reception control means for controlling transmission/reception of a radio signal by the antenna element, wherein the array antenna forming means may select at least two of the transmission/reception devices and combine the selected transmission/reception devices, to thereby sequentially form one array antenna. With the above, it is possible to switch combinations of the transmission/reception devices used in communication with each of the mobile station devices, based on the array antenna communication performance values, and to improve the adaptive array performance of the entire base station device.

In one aspect of the present invention, the adaptive array base station device may further include array antenna transmission control means, every time the array antenna forming means forms the array antenna, for transmitting a radio signal having a predetermined directivity pattern from the array antenna to each receiving antenna element which is the antenna element included in each of some or all of the transmission/reception device(s) other than the at least two transmission/reception devices forming the array antenna; wherein the array antenna communication performance measurement means may measure a reception level of the radio signal received at each of some or all of the receiving antenna elements with respect to a transmission from each of the array antennas sequentially formed by the array antenna forming means, and calculate the respective array antenna communication performance values, based on the respective reception levels. With the above, it is possible to obtain in a self-supporting manner, without being premised on the presence of another device, an array antenna communication performance value.

In one aspect of the present invention, the array antenna communication performance measurement means may further include individual transmission control means for sequentially transmitting, from each of the at least two transmission/reception devices forming the array antenna, a radio signal having a transmission power equivalent to each transmission power in a transmission of the radio signal from the array antenna, carried out by the array antenna transmission control means, and reference reception level measurement means for measuring a reception level of the radio signal received at each of the some or all of the receiving antenna elements with respect to the transmission from each of the at least two transmission/reception devices, and calculating a reference reception level which is a sum of at least two of the reception levels, and calculate the respective array antenna communication performance values, further based on the reference reception level. With the above, it is possible to obtain an array antenna communication performance value, based on a gain of a reception level obtained by carrying out an array antenna transmission, without being premised on the presence of another device.

In one aspect of the present invention, the predetermined directivity pattern may have directivity in a direction of at least any one of the receiving antenna elements among the respective receiving antenna elements, and the predetermined performance condition may state that the array antenna communication performance value in at least the any one receiving antenna element is equal to or larger than a predetermined value. With the above, it is possible to switch combinations of the transmission/reception devices used in communication with each of the mobile station devices, based on the beam forming performance of the array antenna, and to improve the adaptive array performance of the entire base station device.

In one aspect of the present invention, the predetermined directivity pattern may further have a null point of the directivity in a direction of each of at least some other receiving antenna elements other than the any one receiving antenna element, and the predetermined performance condition may further include a condition stating that the array antenna communication performance value in each of the at least some other receiving antenna elements is smaller than the predetermined value. With the above, it is possible to switch combinations of the transmission/reception devices to use in communication with each of the mobile station devices, based on the beam forming performance and null steering performance of the array antenna, and to improve the adaptive array performance of the entire base station device.

BRIEF DESCRIPTION OF THE DRAWINGS

FIG. 1 is a diagram showing a system configuration of a mobile communication system and a base station device according to an embodiment of the present invention;

FIG. 3 is a diagram explaining self-supporting measurement of the communication performance of an array antenna;

FIG. 4 is a diagram showing one example of a measurement result of a reception level obtained in measurement of array antenna communication performance;

FIG. 5 is a diagram explaining self-supporting measurement of the communication performance of each transmission/reception device;

FIG. 6 is a diagram showing one example of a measurement result of a reception level obtained in measurement of the communication performance of each transmission/reception device and a calculation result of a reference reception level;

FIG. 8 is a diagram showing one example of a calculation result of isolation between respective transmission/reception devices;

FIG. 9 is a diagram showing one example of a calculation result of an array antenna communication performance value;

BEST MODE FOR CARRYING OUT THE INVENTION

Figure 2:
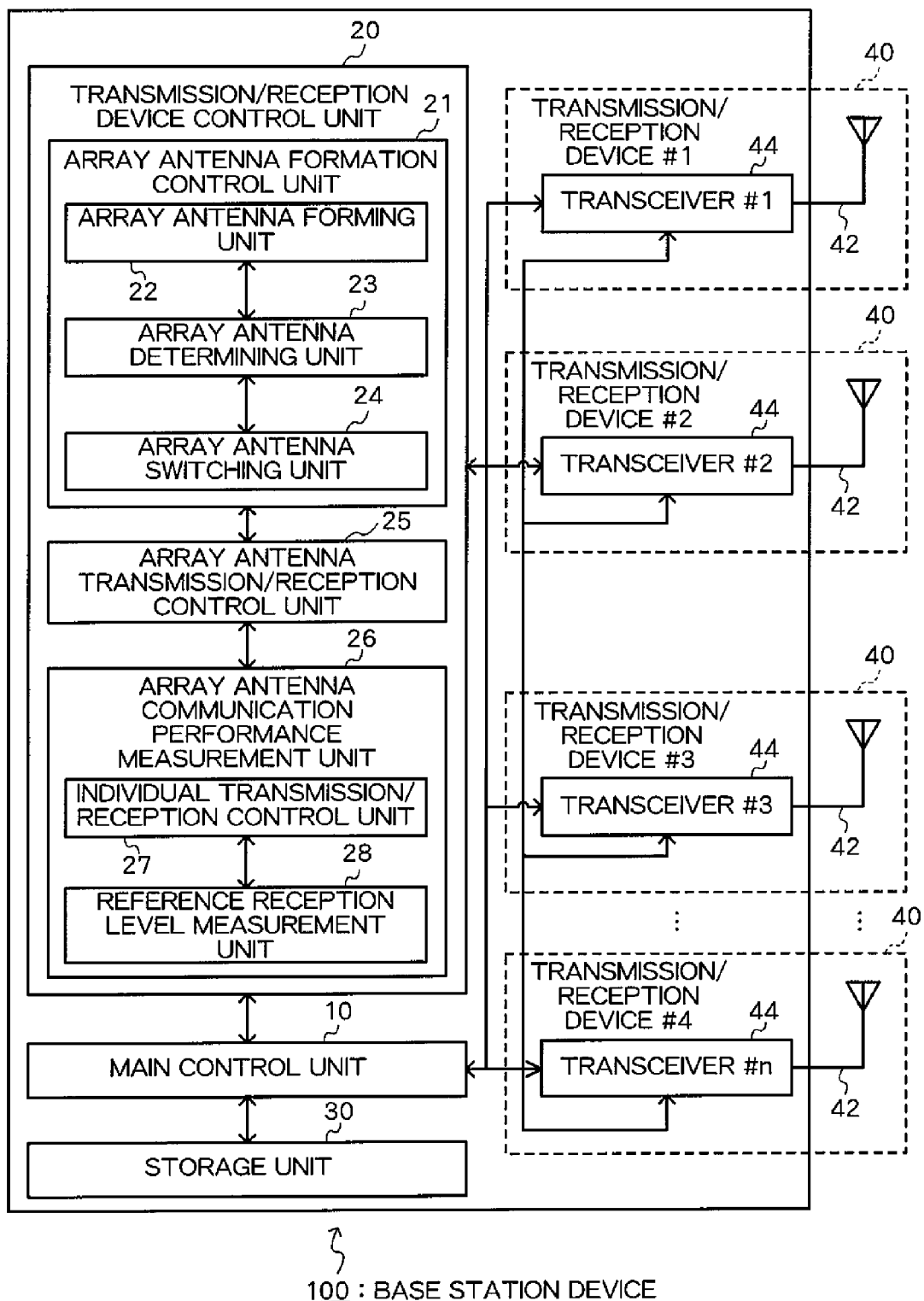
FIG. 2 is a functional block diagram of the base station device according to the embodiment of the present invention.

In the following, an embodiment of the present invention will be described based on the drawings. FIG. 1(a) is a diagram showing an entire configuration of a mobile communication system 150 according to an embodiment of the present invention. As shown in the diagram, the mobile communication system 150 includes a base station device 100 connected to a communication network 120 via a wired transmission path and a plurality of mobile station devices 120 connected to the base station device 100 via a radio transmission path.

FIG. 1(b) is a diagram showing a configuration of the base station device 100. As shown in the diagram, the base station device 100 includes three or more antenna elements 42 and three or more transceivers 44 connected to the respective antenna elements 42, for controlling transmission/reception of a radio signal via the respective antenna elements 42. In this embodiment, for convenience, an example in which the base station device 100 has four antenna elements 42 and four transceivers 44 will be described.

FIG. 2 is a functional block diagram of the base station device 100. The base station device 12 includes a main control unit 10, a transmission/reception device control unit 20, a storage unit 30, and three or more transmission/reception devices 40, and combines at least two transmission/reception devices 40 to thereby form an array antenna. The base station device 100 is characteristic in having a self-examination function for the transmission/reception device 40, for measuring the communication performance of an array antenna by receiving a radio signal sent from the array antenna by another transmission/receiving device 40 not forming the array antenna. Utilization of the self-examination function makes it possible to determine in a self-supporting manner, without being premised on the presence of another device, a combination of transmission/reception devices 40 forming an array antenna superior in communication performance. In the following, the respective components of the base station device 100 will be described in detail.

The main control unit 10 includes a CPU and a memory and so forth, and controls the entire base station device 100.

The storage unit 30 includes, e.g., a memory of the main control unit 10, and functions as a working memory for the main control unit 10 and transmission/reception device control unit 20.

The transmission/reception device 40 includes at least one antenna element 42 and transceiver 44, and receives a transmission signal from a mobile station device or the like via the antenna element 42, and outputs a voice signal, a communication packet, and so forth, obtained by demodulating the received signal to the main control unit 10. Further, according to an instruction from the main control unit 10, the transmission/reception device 40 modulates a voice signal, a communication packet, and so forth, input from the main control unit 10 into a transmission signal, and transmits via the antenna element 42.

The transmission/reception device control unit 20 includes an array antenna formation control unit 21, an array antenna transmission/reception control unit 25, and an array antenna communication performance measurement unit 26, and is connected to each transmission/reception device 40. The transmission/reception device control unit 20 instructs each transmission/reception device 40 to independently carry out radio signal transmission/reception and to couple at least two transmission/reception devices 40 to thereby form an array antenna so that radio signal transmission/reception via the array antenna is carried out through cooperative operation of the respective transmission/reception devices 40.

The array antenna formation control unit 21 includes an array antenna forming unit 22, an array antenna determining unit 23, and an array antenna switching unit 24, and carries out a process to combine at least two transmission/reception devices 40 to thereby form an array antenna.

The array antenna forming unit 22 selects at least two transmission/reception devices 40, and combines the selected transmission/reception devices 40 to thereby form a single array antenna.

Every time the array antenna forming unit 22 forms an array antenna, the array antenna transmission/reception control unit 25 transmits a radio signal having a predetermined directivity pattern from the array antenna to each of some or all of the transmission/reception devices 40 other than the at least two transmission/reception devices forming the array antenna, that is, to an antenna element 42 (hereinafter referred to as a receiving antenna element) included in each of some or all of the transmission/reception devices 40 not forming the array antenna. A directivity pattern refers to a spatial range in which radio signal transmission/reception via an antenna is possible. In applying self-examination for an antenna array, formation of the directivity pattern by the array antenna transmission/reception control unit 25 so as to have directivity in the direction of at least any one receiving antenna element enables measurement of beam forming performance of the array antenna. Also, formation of the directivity pattern so as to have a null point of the directivity in the direction of each of at least some other receiving antenna elements enables measurement of null steering performance of the array antenna.

FIG. 3 is a diagram explaining self-supporting measurement of the communication performance of an array antenna formed by combining two transmission/reception devices 40. Specifically, FIG. 3 shows a situation in which the array antenna transmission/reception control unit 25 transmits a radio signal having a main beam in the direction of the transmission/reception device TRX3 by means of beam forming and having a null point in the direction of the transmission/reception device TRX4 by means of null steering, from the array antenna formed by combining the transmission/reception devices TRX1 and TRX2 by the array antenna forming unit 22. With the above, the beam forming performance of the array antenna including the TRX1 and TRX2 can be measured in a self-supporting manner, based on the reception level in the TRX3. In addition, the null steering performance of the array antenna including the TRX1 and TRX2 can be also measured in a self-supporting manner, based on the reception level in the TRX4. Further, with an arrangement in which the adaptive array forming unit 22 sequentially changes the combinations of the transmission/reception devices 40 so that an array antenna is formed with respect to all combinations of the transmission/reception devices 40, it is possible to measure adaptive array communication performance with respect to all of the array antennas which can be formed in the base station device 100. FIG. 4 shows one example of a measurement result of a reception level obtained in measurement of the communication performance of an array antenna formed by combining any two transmission/reception devices 40. The measurement result shown in this diagram is obtained when beam forming is carried out relative to a TRX having a smaller number of two transmission/reception devices 40 on the receiver side, and null steering is carried out relative to a TRX having a larger number. It should be noted that the measurement result shown in this diagram is obtained when the transmission levels of the respective TRXs are all set at 30.0 dBm.

The array antenna communication performance measurement unit 26 includes an individual transmission/reception control unit 27 and a reference reception level measurement unit 28, and measures a reception level of a radio signal received at each of some or all of the receiving antenna elements with respect to a transmission from each of the array antennas sequentially formed by the array antenna forming unit 22. The array antenna communication performance measurement unit 26 calculates, based on the respective reception levels, an array antenna communication performance value indicating communication performance of each corresponding array antenna. Note that a reception level itself with respect to a transmission from each array antenna may be used as an array antenna communication performance value. In the example shown in FIG. 3, it is shown that a higher reception level in the TRX3, to which the main beam is directed, leads to higher beam forming performance of the array antenna including the TRX1 and TRX2, and a lower reception level in the TRX4, to which the null point is directed, leads to higher null steering performance of the same. According to the measurement result shown in FIG. 4, the beam forming performance value and null steering performance value of the array antenna formed by combining the TRX1 and TRX2 are −15.0 dBm and −49.2 dBm, respectively.

Alternatively, the array antenna communication performance value may be determined not solely based on the reception level with respect to a transmission from each array antenna, but also based on a reference reception level obtained from the individual transmission/reception control unit 27 and reference reception level measurement unit 28. That is, the individual transmission control unit 27 sequentially transmits, from each of at least two transmission/reception devices 40 forming each array antenna, a radio signal having a transmission power equivalent to each transmission power in a radio signal transmission from each array antenna, carried out by the array antenna transmission/reception control unit 25. The reference reception level measurement unit 28 measures a reception level of a radio signal received at each of some or all of the receiving antenna elements with respect to a transmission from each of the at least two transmission/reception devices, and obtains a sum of at least two reception levels as a reference reception level.

FIG. 5 is a diagram explaining self-supporting measurement of the communication performance of each transmission/reception device 40 alone. FIG. 5 shows a situation in which the individual transmission/reception control unit 27 transmits, from the TRX1, a radio signal having a transmission power equivalent to that in a radio signal transmission carried out by the array antenna transmission/reception control unit 25. With this arrangement, the communication performance of the TRX1 alone can be measured in a self-supporting manner, based on the respective reception levels in the TRX2 to TRX4. FIG. 6(*a*) shows an example of a measurement result of a reception level obtained in measurement of the communication performance of each transmission/reception device 40 alone. FIG. 6(*a*) shows that the reception levels −20.0 dBm, −25.0 dBm, −21.0 dBm are obtained in the TRX2, TRX3, TRX4, respectively, with respect to a transmission from the TRX1. Note that the measurement result shown in FIG. 6(*a*) is obtained when the transmission levels of the respective TRXs are all set at 30.0 dBm, similar to FIG. 4.

FIG. 6(*b*) shows a calculation result of a reference reception level of an array antenna formed by combining two transmission/reception devices 40, calculated by the reference reception level measurement unit 28, based on the measurement result shown in FIG. 6(*a*). For example, the reference reception level in the TRX3 with respect to a transmission from the array antenna formed by combining the TRX1 and TRX2 is −18.0 dBm, or the sum (a sum of the received powers) of the reception level, namely, −25.0 dBm, in the TRX3 with respect to a transmission from the TRX1 alone and the reception level, namely, −19.0 dBm, in the TRX3 with respect to a transmission from the TRX2 alone. Generally, it is known that when an array antenna transmission is carried out with respect to a receiving antenna, using N number of antennas and all of the phases are matched at the ends of the respective receiving antennas, a received power N times as much as that which would be obtained when an array antenna transmission is not applied is obtained. As the reference reception level obtained by the reference reception level measurement unit 28 corresponds to the received power which would be obtained when array antenna transmission is not carried out, the reference reception level can be used as a reference reception level in measurement of a gain to be obtained by carrying out an array antenna transmission. That is, a larger reception level related to an array antenna transmission, compared to the reference reception level related to the array antenna, leads to higher beam forming performance of the array antenna, and a lower reception level related to an array antenna transmission, compared to the reference reception level, leads to higher null steering performance.

Figure 7:
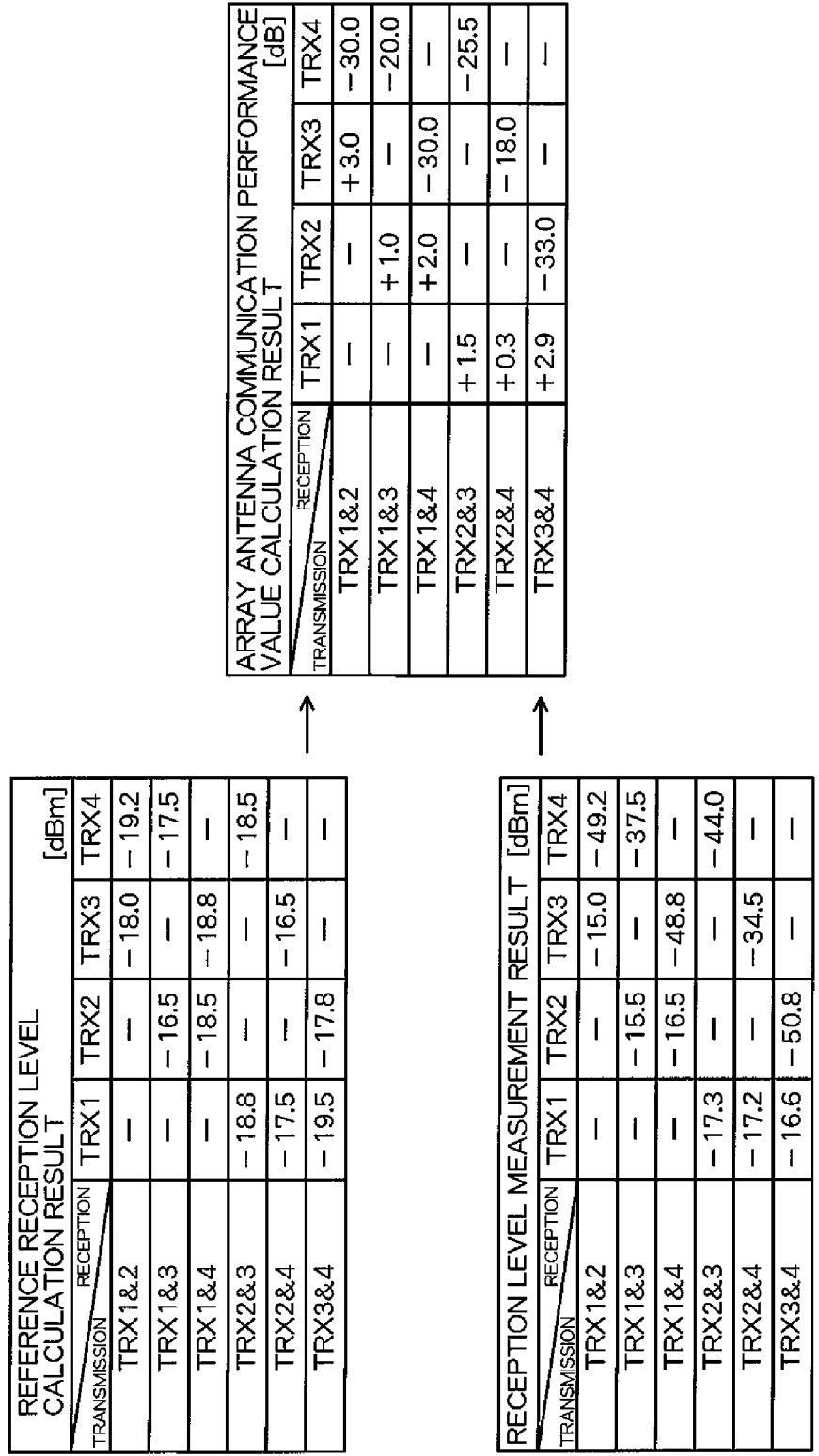
FIG. 7 is a diagram showing one example of a calculation result of an array antenna communication performance value.

FIG. 7 shows an array antenna communication performance value obtained based on the measurement result of the reception level shown in FIG. 4 and the calculation result of the reference reception level shown in FIG. 6(*b*) according to the above described idea. In the above, the difference (a received power ratio) between the reception level shown in FIG. 4 and the reference reception level shown in FIG. 6(*b*) is determined as an array antenna communication performance value. For example, the array antenna communication performance value (a beam forming performance value) in the TRX3, of the array antenna formed by combining the TRX1 and TRX2 is equal to 3.0 dB, as obtained by subtracting −18.0 dBm from −15.0 dBm, and an array antenna communication performance value (a null steering performance value) in the TRX4 is equal to −30.0 dB, as obtained by subtracting −19.2 dBm from −49.2 dBm. It is known from FIG. 7, that the combination of the TRX1 and TRX2 and the combination of the TRX3 and TRX4 present preferable beam forming performance (an array gain) and null steering performance (a null depth).

FIG. 8 shows a calculation result of isolation indicating an degree of separation (lowness of transmission/reception correlation) between the respective transmission/reception devices 40. As the measurement result shown in FIG. 6(*a*) is obtained when the transmission levels of the respective TRXs are all set at 30.0 dBm, the isolation between the respective transmission/reception devices 40 can be expressed as, e.g., the magnitude of the reception level with respect to the transmission level. Here, the difference (a ratio between the received power and the transmission power) between the reception level and the transmission level is defined as isolation. For example, the isolation between the TRX1 and TRX2 is equal to −50.0 dB, as obtained by subtracting the transmission level, namely, 30.0 dBm, of the TRX1 from the reception level, namely, −20.0 dBm, of the TRX2 with respect to a transmission from the TRX1. The isolation obtained using the above described method can be used in determining, e.g., whether or not performance measurement by the array antenna communication performance measurement unit 26 can be normally carried out (an abnormal value close to 0 dBm indicates that the performance measurement is not possible). Further, the isolation can be used to lower the selection priority order of, or exclude from a selection target, a combination of transmission/reception devices 40, which presents an abnormal isolation value, and so forth.

The array antenna determining unit 23 selects an array antenna having an array antenna communication performance value satisfying a predetermined performance condition, based on some or all of the respective array antenna communication performance values generated by the array antenna communication performance measurement unit 26, and determines the combination of at least two transmission/reception devices forming the selected array antenna as a combination presenting superior array antenna communication performance. Specifically, an array antenna of which an array antenna communication performance value in at least any one receiving antenna element to which beam forming is applied is equal to or larger than a predetermined value may be selected. With this arrangement, it is possible to determine a combination of transmission/reception devices forming an array antenna superior in beam forming performance. Also, an array antenna of which array antenna communication performance values in at least some other receiving antenna elements to which null steering is applied are respectively smaller than a predetermined value may be selected. With this arrangement, it is possible to determine a combination of transmission/reception devices forming an array antenna superior in both beam forming performance and null steering performance. For example, when the array antenna communication performance value generated by the array antenna communication performance measurement unit 26 is the value shown in FIG. 7, and a condition stating that the beam forming performance should be equal to or larger than 2.5 dB and a condition stating that the null steering performance should be equal to or smaller than −32.0 dB are set as conditions for selecting an array antenna, the combination of the TRX3 and TRX4 alone satisfies both conditions. In this case, the array antenna determining unit 23 determines the combination of the TRX3 and TRX4 as a combination presenting superior beam forming performance and null steering performance.

The array antenna switching unit 24 selects an array antenna having an array antenna communication performance value satisfying a predetermined performance condition, based on some or all of the respective array antenna communication performance values generated by the array antenna communication performance measurement unit 26, and uses the selected array antenna in communication with at least one mobile station device 110. Specifically, it is possible to determine a performance condition for selecting an array antenna, based on the communication quality in communication with each mobile station device 110.

For example, when the base station device 100 is communicating with a mobile station device 110 and the mobile station device 110 then moves to a weak electric field area, the communication quality is remarkably deteriorated. In such a case, use of an array antenna superior in beam forming performance is desired in order to avoid communication disconnection or initiation of handover. That is, it is desired to set making much of the beam forming performance as a performance condition for selecting an array antenna, based on the communication quality. When the array antenna communication performance value generated by the array antenna communication performance measurement unit 26 is the value shown in FIG. 9, the combination of the TRX1 and TRX2 and the combination of the TRX3 and TRX4 both present preferable beam forming performance and null steering performance, and thus can be considered as well-balanced standard array antennas. Meanwhile, the combination of the TRX1 and TRX4 and the combination of the TRX2 and TRX3 are particularly superior in beam forming performance, and thus can be considered as array antennas effective when beam forming should be made much of. Further, the combination of the TRX1 and TRX3 and the combination of the TRX2 and TRX4 are particularly superior in null steering performance, and thus can be considered as array antennas effective when null steering should be made much of. Therefore, in the above described case, either the combination of the TRX1 and TRX4 or the combination of the TRX2 and TRX3 is selected by the array antenna switching unit 24, and used for the communication. In this manner, disconnection of the communication and/or initiation of handover can be avoided with increased possibility.

Besides, the communication quality is remarkably deteriorated when the influence of an interference wave from another communication device increases. In this case, use of an array antenna superior in null steering performance is desired in order to suppress the influence of the interference wave as much as possible. That is, it is desired to set making much of the null steering performance as a performance condition for selecting an array antenna, based on the communication quality. In this case, in the example shown in FIG. 9, either the combination of the TRX1 and TRX3 or the combination of the TRX2 and TRX4 is selected by the array antenna switching unit 24, and used for the communication. In this manner, an interference wave from another communication device can be suppressed.

Alternatively, in the array antenna switching unit 24, a performance condition for selecting an array antenna may be determined based on the number of mobile station devices 110 engaged in communication with the base station device 100, the traffic in the base station device 100, or the like. With this arrangement, for example, in an area with few traffic, an array antenna having a standard array antenna communication performance value is used with priority, so that the overall throughput of the base station device 100 can be improved.

In the following, a process to determine in a self-supporting manner a combination of transmission/reception devices forming an array antenna by utilizing the self-examination function will be described, based on the flowcharts shown in FIGS. 10 to 13.

Figure 10:
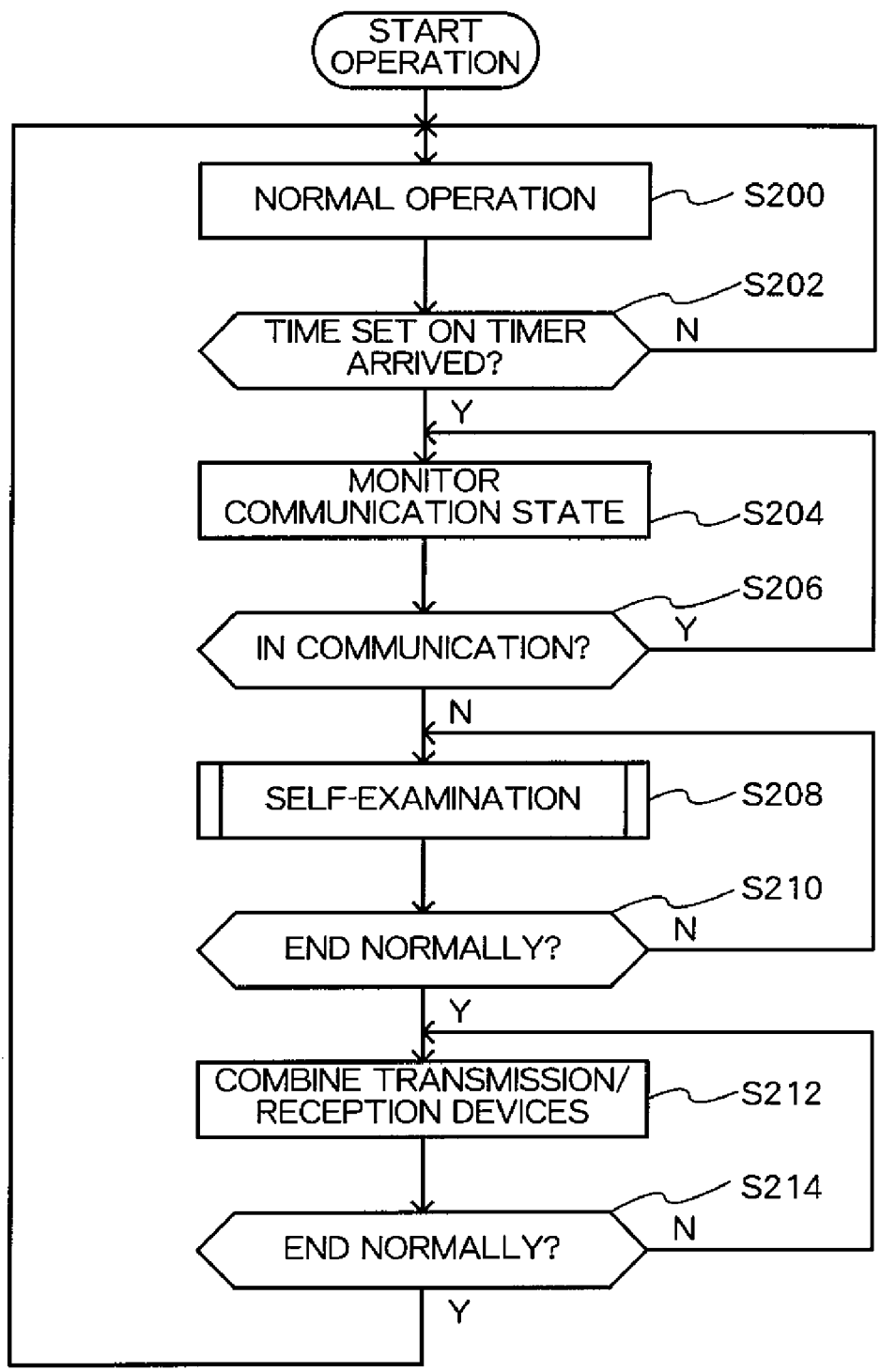
FIG. 10 is a flowchart explaining a process being carried out in the base station device.

FIG. 10 is a flowchart explaining a process being carried out in the base station device 100. With the operation in the base station device 100 begun, a normal operation is kept carried out until the time set on the timer arrives (S200, S202). When the time set on the timer arrives (S202), while monitoring the communication state (S204), whether or not communication is currently ongoing is determined (S206). When it is determined that communication is ongoing, the monitoring on the communication state is continued until the communication ends (S204). When the communication ends (S206), a self-examination process begins (S208).

Figure 11:
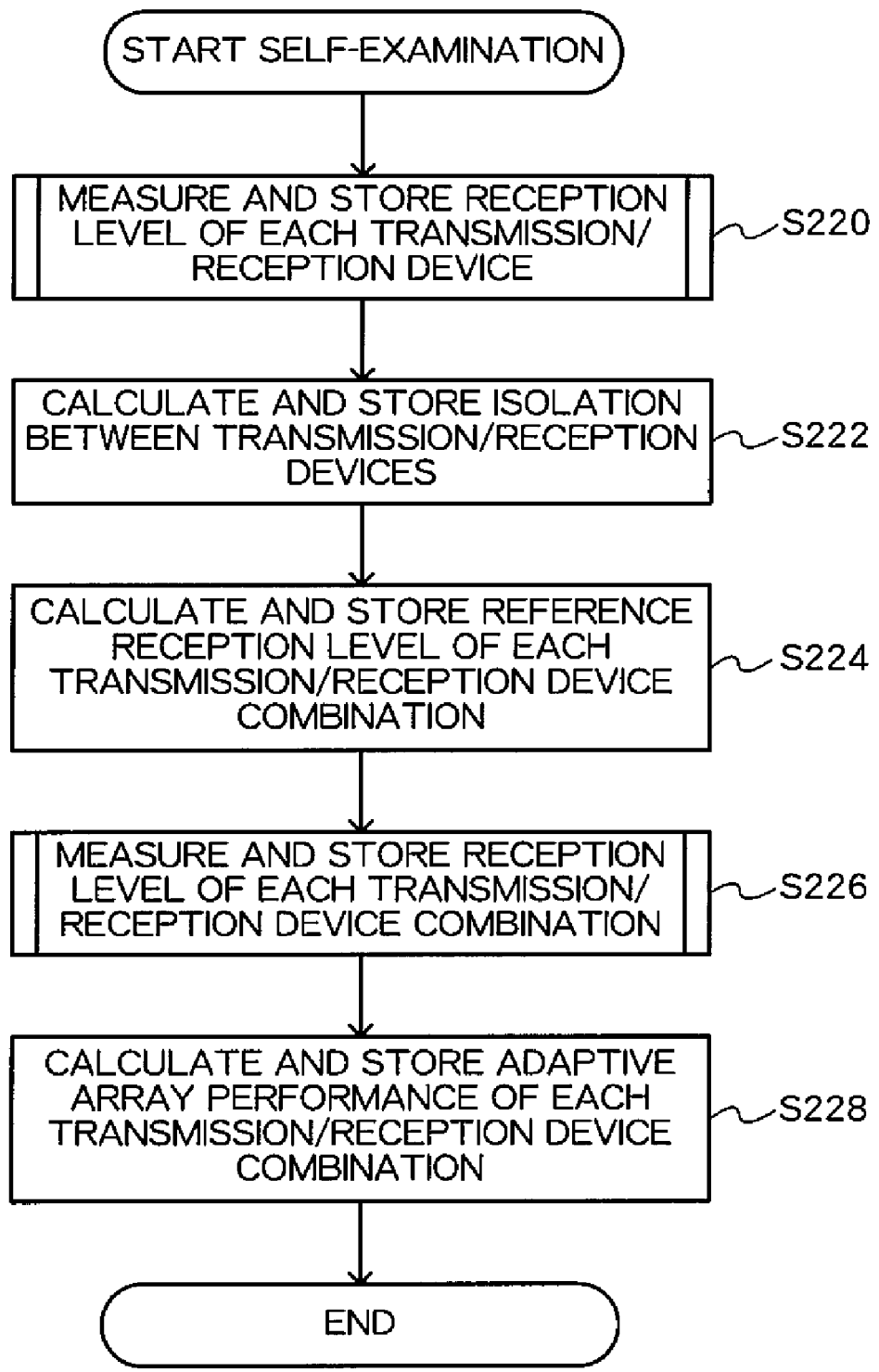
FIG. 11 is a flowchart explaining a self-examination process.

FIG. 11 is a flowchart explaining a self-examination process. In the self-examination process, initially, the individual transmission/reception control unit 27 and reference reception level measurement unit 28 measure a reception level in each transmission/reception device 40, and stores the measurement result in the storage unit 30 (S220).

Figure 12:
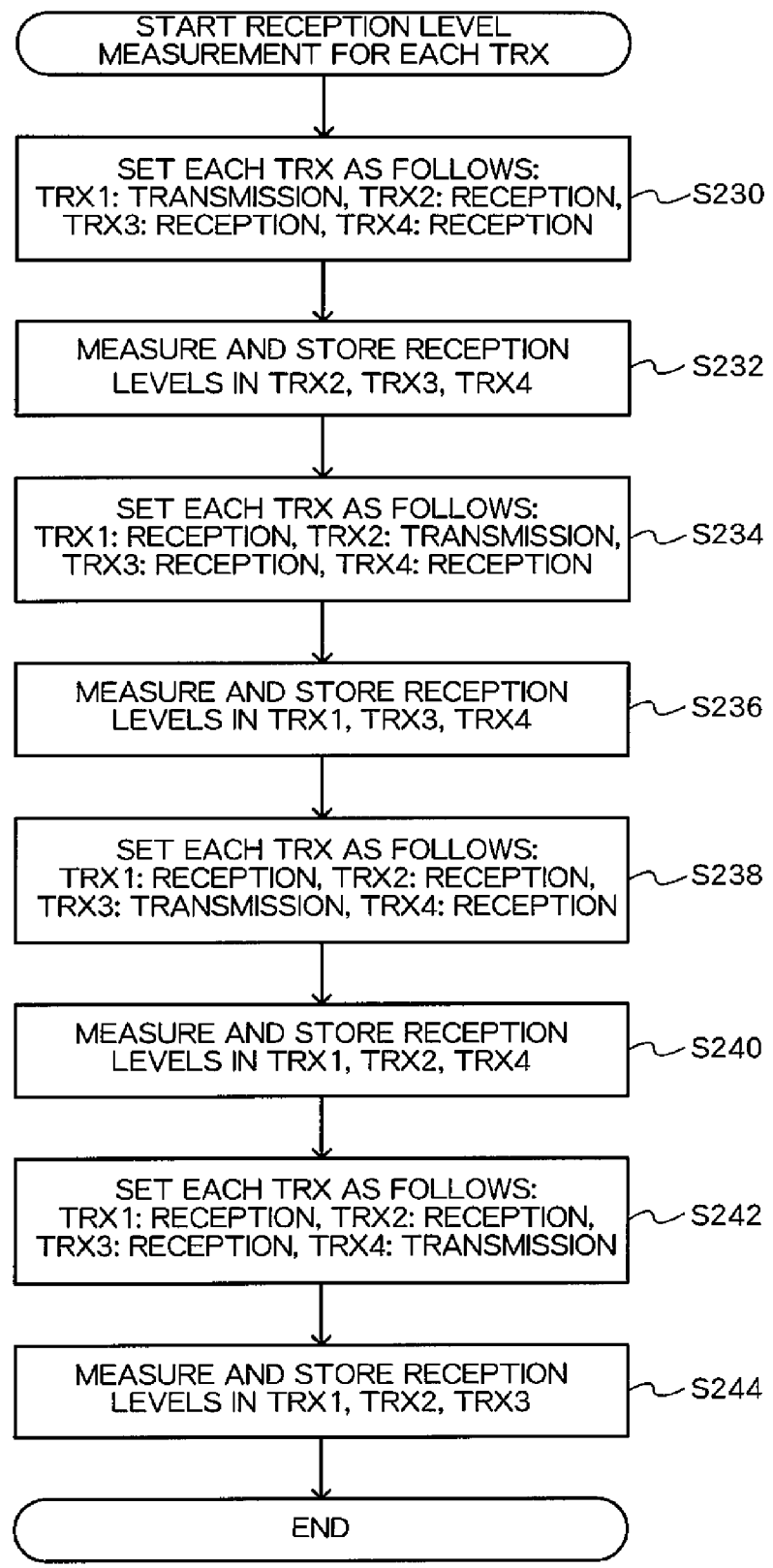
FIG. 12 is a flowchart explaining a reception level measurement process to be carried out with respect to every transmission/reception device.

FIG. 12 is a flowchart showing details of the process at S220. In the process at S220, the individual transmission/reception control unit 27 sets the TRX1 in a transmission state and the TRX2 to TRX4 in a reception state (S230), then measures the reception levels in the TRX2 to TRX4 with respect to a transmission from the TRX1, and stores the measurement results in the storage unit 30 (S232). Thereafter, similarly, the TRX2, TRX3, TRX4 are sequentially set in a transmission state, and the respective reception levels are measured and stored in the storage unit 30 (S234 to S244). When the reception level measurement is finished with respect to all of the transmission/reception devices 40, the process proceeds to S222.

Thereafter, isolation between the respective transmission/reception devices 40 is calculated, based on the reception levels measured at S220 and the transmission levels from the respective transmission/reception devices 40, and stored in the storage unit 30 (S222). The reference reception level measurement unit 28 calculates the reference reception level of each combination of the transmission/reception devices forming an array antenna, based on the measured reception level, and stores the calculation result in the storage unit 30 (S224). The array antenna transmission/reception control unit 25 and array antenna communication performance measurement unit 28 measure the reception level of each of the array antennas sequentially formed by the array antenna forming unit 22, and stores the measurement result in the storage unit 30 (S226).

Figure 13:
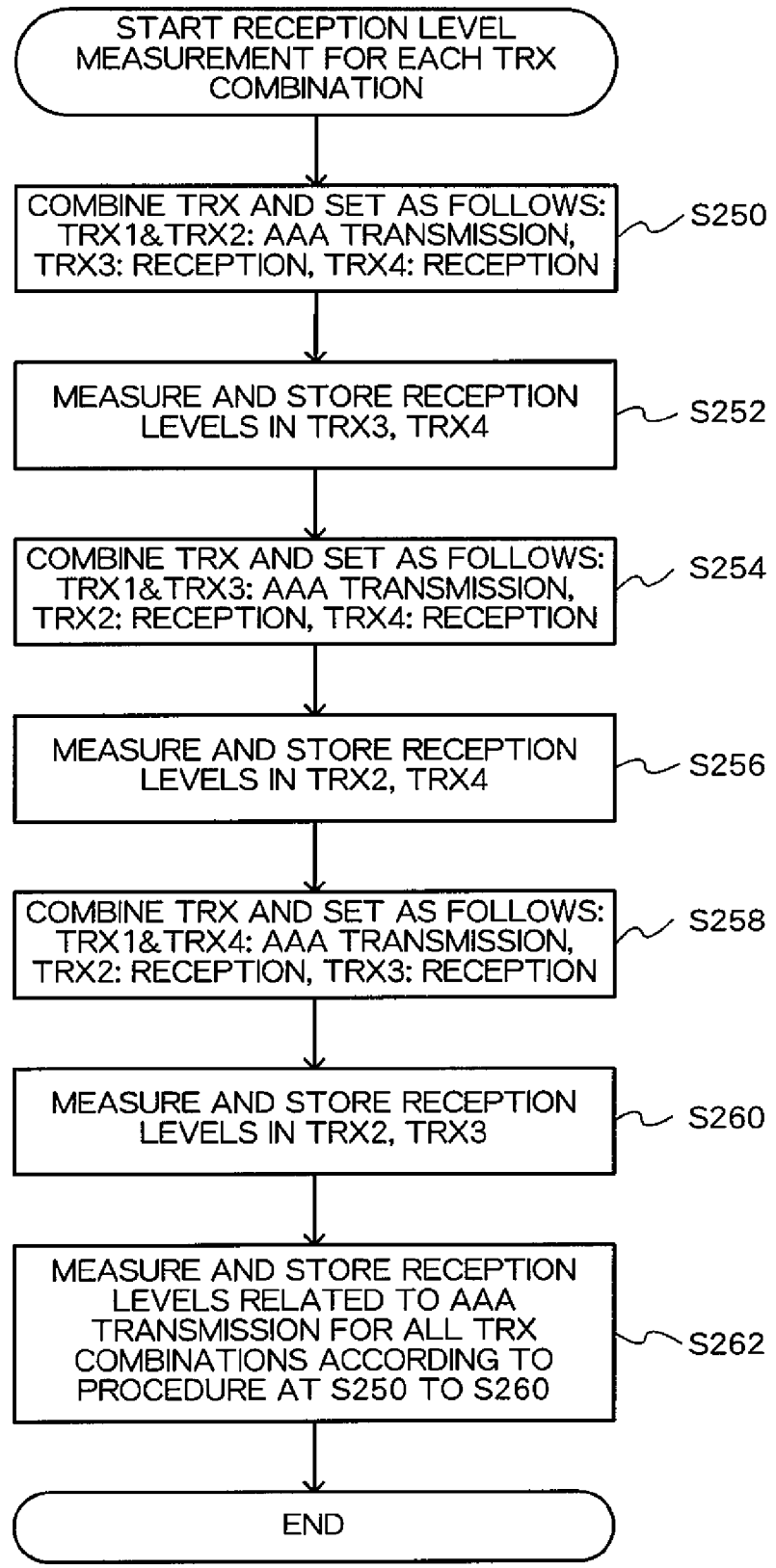
FIG. 13 is a flowchart explaining a reception level measurement process to be carried out with respect to every transmission/reception device combination.

FIG. 13 is a flowchart showing details of the process at S226. In the process at S226, the array antenna forming unit 22 combines the TRX1 and TRX2 to thereby form an array antenna, and the array antenna transmission/reception control unit 25 and array antenna communication performance measurement unit 27 set the array antenna formed by combining the TRX1 and TRX2 in a transmission state and the TRX3 and TRX4 in a state (S250). Then, the reception levels in the TRX3 and TRX4 with respect to transmissions from the TRX1 and TRX2 are measured, and the measurement results are stored in the storage unit 30 (S252). Thereafter, similarly, the respective array antennas each formed by combining two transmission/reception devices are sequentially set in a transmission state, and the reception levels in the respective cases are measured and stored in the storage unit 30 (S254 to S262). When the reception level measurement is finished with respect to all of the array antennas, the process returns to S228.

At S228, the array antenna communication performance measurement unit 27 calculates array antenna performance measurement values, based on the reception levels from the respective array antennas measured at S226, and the reference reception levels calculated at S224, and stores the calculation results in the storage unit 30 (S228). When the communication performance value is obtained with respect to all of the array antennas, the process returns to S210 in FIG. 10.

When the self-examination process does not normally end at S208 (S210), the self-examination is carried out again (S208). Meanwhile, when the self-examination process normally ends (S210), the array antenna determining unit 23 selects an array antenna having a predetermined array antenna communication performance value, based on the respective array antenna performance measurement values stored in the storage unit 30, and determines the combination of two transmission/reception devices forming the array antenna (S212). When the process at S212 does not normally end (S214), the process is carried out again (S212). Meanwhile, when the process normally ends, the process returns to the normal operation (S200).

According to the above described adaptive array base station device and control method therefor, it is possible to determine in a self-supporting manner, without being premised on the presence of another device, the optimum combination of antenna elements and transmission/reception devices including the antenna elements, and to improve the adaptive array performance.

It should be noted that the present invention is not limited to the above described embodiment. For example, although an example in which two transmission/reception devices are combined to form an array antenna is described in the above described embodiment, the number of transmission/reception devices to combine is not limited to two, and three or more transmission/reception devices may be combined to thereby form an array antenna and the communication performance thereof may be measured.

Further, the base station device according to this embodiment may be formed so as to have a structure in which the relation in terms of transmission and reception between a transmission/reception device forming an array antenna and that not forming the array antenna may be reversed from that which is described above. This arrangement enables performance measurement by means of adaptive array reception rather than adaptive array transmission.

The invention claimed is:

1. An adaptive array base station device having three or more transmission/reception devices each including at least one antenna element and transmission/reception control means for controlling transmission/reception of a radio signal via the antenna element, comprising:
   array antenna forming means for selecting at least two of the transmission/reception devices and combining the selected transmission/reception devices, to thereby sequentially form one array antenna;
   array antenna transmission control means, every time the array antenna forming means forms the array antenna, for transmitting a radio signal having a predetermined directivity pattern from the array antenna to each receiving antenna element which is the antenna element included in each of some or all of the transmission/reception device(s) other than the at least two transmission/reception devices forming the array antenna;
   array antenna communication performance measurement means for measuring a reception level of the radio signal received at each of some or all of the receiving antenna elements with respect to a transmission from each of the array antennas sequentially formed by the array antenna forming means, and calculating respective array antenna communication performance values, each indicating communication performance of each of the array antennas, based on the respective reception levels; and
   array antenna determination means for selecting an array antenna having the array antenna communication performance value satisfying a predetermined performance condition, based on some or all of the respective array antenna communication performance values generated by the array antenna communication performance measurement means, and determining a combination of the at least two transmission/reception devices forming the array antenna.

2. The adaptive array base station device according to claim 1, wherein
   the array antenna communication performance measurement means further comprises
      individual transmission control means for sequentially transmitting, from each of the at least two transmission/reception devices forming the array antenna, a radio signal having a transmission power equivalent to each transmission power in a transmission of the radio signal from the array antenna, carried out by the array antenna transmission control means, and
      reference reception level measurement means for measuring a reception level of the radio signal received at each of the some or all of the receiving antenna elements with respect to the transmission from each of the at least two transmission/reception devices, and calculating a reference reception level which is a sum of at least two of the reception levels, and
   calculates the respective array antenna communication performance values, further based on the reference reception level.

3. The adaptive array base station device according to claim 1 or 2, wherein
   the predetermined directivity pattern has directivity in a direction of at least any one of the receiving antenna elements among the respective receiving antenna elements, and
   the predetermined performance condition states that the array antenna communication performance value in at least the any one receiving antenna element is equal to or larger than a predetermined value.

4. The adaptive array base station device according to claim 3, wherein
   the predetermined directivity pattern further has a null point of the directivity in a direction of each of at least some other receiving antenna elements other than the any one receiving antenna element, and
   the predetermined performance condition further includes a condition stating that the array antenna communication performance value in each of the at least some other receiving antenna elements is smaller than the predetermined value.

5. A control method for an adaptive array base station device having three or more transmission/reception devices each including at least one antenna element and transmission/reception control means for controlling transmission/reception of a radio signal via the antenna element, comprising:

an array antenna forming step of selecting at least two of the transmission/reception devices and combining the selected transmission/reception devices, to thereby sequentially form one array antenna;

an array antenna transmission control step, every time the array antenna is formed at the array antenna forming step, for transmitting a radio signal having a predetermined directivity pattern from the array antenna to each receiving antenna element which is the antenna element included in each of some or all of the transmission/reception device(s) other than the at least two transmission/reception devices forming the array antenna;

an array antenna communication performance measurement step of measuring a reception level of the radio signal received at each of some or all of the receiving antenna elements with respect to a transmission from each of the array antennas sequentially formed at the array antenna forming step, and calculating respective array antenna communication performance values, each indicating communication performance of each of the array antennas, based on the respective reception levels; and an array antenna determination step of selecting an array antenna having the array antenna communication performance value satisfying a predetermined performance condition, based on some or all of the respective array antenna communication performance values generated at the array antenna communication performance measurement step, and determining a combination of the at least two transmission/reception devices forming the array antenna.

6. An adaptive array base station device for carrying out radio communication with each of a plurality of mobile station devices, selectively using at least three antenna elements, comprising:

array antenna forming means for selecting at least two of the antenna elements and combining the selected antenna elements, to thereby sequentially form one array antenna;

array antenna communication performance measurement means, every time the array antenna forming means forms the array antenna, for measuring communication performance of the array antenna, and calculating respective array antenna communication performance values, each indicating communication performance of each of the array antennas, based on the respective measurement results; and array antenna switching means for selecting an array antenna having the array antenna communication performance value satisfying a predetermined performance condition, based on some or all of the respective array antenna communication performance values generated by the array antenna communication performance measurement means, and using the array antenna in communication with at least one of the mobile station devices, wherein the predetermined performance condition is determined based on information describing a communication state in the communication with each of the mobile station devices.

7. The adaptive array base station device according to claim 6, wherein the communication state in the communication with each of the mobile station devices is communication quality in each communication.

8. The adaptive array base station device according to claim 6, wherein the communication state in the communication with each of the mobile station devices is the number of the mobile station devices engaged in communication with the adaptive array base station device.

9. The adaptive array base station device according to any one of claims 6, 7 and 8, comprising:

three or more transmission/reception devices, each including the at least one antenna element and transmission/reception control means for controlling transmission/reception of a radio signal by the antenna element, wherein the array antenna forming means selects at least two of the transmission/reception devices and combines the selected transmission/reception devices, to thereby sequentially form one array antenna.

10. The adaptive array base station device according to claim 9, further comprising:

array antenna transmission control means, every time the array antenna forming means forms the array antenna, for transmitting a radio signal having a predetermined directivity pattern from the array antenna to each receiving antenna element which is the antenna element included in each of some or all of the transmission/reception device(s) other than the at least two transmission/reception devices forming the array antenna;

wherein the array antenna communication performance measurement means measures a reception level of the radio signal received at each of some or all of the receiving antenna elements with respect to a transmission from each of the array antennas sequentially formed by the array antenna forming means, and calculates the respective array antenna communication performance values, based on the respective reception levels.

11. The adaptive array base station device according to claim 10, wherein the array antenna communication performance measurement means further comprises individual transmission control means for sequentially transmitting, from each of the at least two transmission/reception devices forming the array antenna, a radio signal having a transmission power equivalent to each transmission power in a transmission of the radio signal from the array antenna, carried out by the array antenna transmission control means, and reference reception level measurement means for measuring a reception level of the radio signal received at each of the some or all of the receiving antenna elements with respect to the transmission from each of the at least two transmission/reception devices, and calculating a reference reception level which is a sum of at least two of the reception levels, and calculates the respective array antenna communication performance values, further based on the reference reception level.

12. The adaptive array base station device according to claim 10, wherein the predetermined directivity pattern has directivity in a direction of at least any one of the receiving antenna elements among the respective receiving antenna elements, and the predetermined performance condition states that the array antenna communication performance value in at least the any one receiving antenna element is equal to or larger than a predetermined value.

13. The adaptive array base station device according to claim 10, wherein the predetermined directivity pattern further has a null point of the directivity in a direction of each of at least some other receiving antenna elements other than the any one receiving antenna element, and the predetermined performance condition further includes a condition stating that the array antenna communication performance value in each of the at least some other receiving antenna elements is smaller than the predetermined value.

14. A control method for an adaptive array base station device for carrying out radio communication with each of a plurality of mobile station devices, selectively using at least three antenna elements, comprising:

an array antenna forming step of selecting at least two of the antenna elements and combining the selected antenna elements, to thereby sequentially form one array antenna;

an array antenna communication performance measurement step, every time the array antenna is formed at the array antenna forming step, of measuring communication performance of the array antenna, and calculating respective array antenna communication performance values, each indicating communication performance of each of the array antennas, based on the respective measurement results; and an array antenna switching step of selecting an array antenna having the array antenna communication performance value satisfying a predetermined performance condition, based on some or all of the respective array antenna communication performance values generated at the array antenna communication performance measurement step, and using the array antenna in communication with at least one of the mobile station devices, wherein the predetermined performance condition is determined based on information describing a communication state in the communication with each of the mobile station devices.

* * * * *